(12) United States Patent
Buck

(10) Patent No.: US 6,305,295 B1
(45) Date of Patent: Oct. 23, 2001

(54) STOPPING DEVICE FOR A TRANSPORT TROLLEY

(75) Inventor: Walter Buck, Delmenhorst (DE)

(73) Assignee: Elektrieiteit voor Goederenbehandeling Marine en Industrie in het kort Egemin naamloze vennootschap, Schoten (BE)

( * ) Notice: Subject to any disclaimer, the term of this patent is extended or adjusted under 35 U.S.C. 154(b) by 0 days.

(21) Appl. No.: 09/526,521

(22) Filed: Mar. 16, 2000

(30) Foreign Application Priority Data

Mar. 15, 1999  (BE) .................................................... 9900178

(51) Int. Cl.[7] ...................................................... B61K 7/00
(52) U.S. Cl. ........................... 104/249; 104/166; 104/251
(58) Field of Search .................................... 104/166, 249, 104/251, 172.1; 198/345.2, 575

(56) References Cited

U.S. PATENT DOCUMENTS

| | | | | |
|---|---|---|---|---|
| 3,343,645 | * | 9/1967 | Doerfling | 104/249 |
| 3,356,040 | * | 12/1967 | Fonden | 104/166 |
| 3,696,756 | * | 10/1972 | Elmore et al. | 104/251 |
| 3,818,837 | * | 6/1974 | Jacoby et al. | 104/166 |
| 4,036,148 | * | 7/1977 | Jones et al. | 104/166 |
| 4,086,854 | | 5/1978 | Scheel | 104/166 |
| 4,347,792 | * | 9/1982 | Nagahori | 104/166 |
| 4,515,085 | | 5/1985 | Rohrbach | 104/166 |
| 4,838,171 | | 6/1989 | Yokoi et al. | 104/166 |

FOREIGN PATENT DOCUMENTS

| | | |
|---|---|---|
| 2 067 488 | 7/1981 | (GB) . |
| 2 067 489 | 7/1981 | (GB) . |

* cited by examiner

*Primary Examiner*—S. Joseph Morano
*Assistant Examiner*—Lars A. Olson
(74) *Attorney, Agent, or Firm*—Bacon & Thomas, PLLC

(57) ABSTRACT

Stopping device for a transport trolley which can be moved along guidances or rails (2–3), whereby the transport trolley (4) is provided with driving wheels (7) which cooperate with a driving axle (6) and which, by means of a lever (14) with a contact wheel (17), can be set at different angles in respect to said driving axle (6), characterized in that this stopping device (1) consists of at least a lever (20) with an ascending edge (40) and a descending lateral edge (41), prolonged by an acceleration lever (24), the transition of which is formed by a tip (T), and a hydraulic, pneumatic or electric drive which can position said levers (20) and (24) in three positions, namely, with said tip (T) outside the path of said contact wheel (17) and out of contact with levers (20) and (24); with lever (20) and tip (T) entirely in the path of the contact wheel (17); and with the tip (T) outside of the path of the contact wheel (17), however, with the contact wheel (17) in contact with the acceleration lever (24).

3 Claims, 4 Drawing Sheets

STOPPING DEVICE FOR A TRANSPORT TROLLEY

BACKGROUND OF THE INVENTION

1. Field of the invention.

The present invention relates to a stopping device for a transport trolley, more particularly a stopping device for a transport trolley driven by a continuously rotating axle which is positioned according to the movement direction of such trolley.

2. Discussion of the related art.

More particularly, the present invention has as an object a stopping device for transport trolleys whereby the transport trolley is moved along guidances or rails, preferably on running wheels, and whereby under this transport trolley, driving wheels are provided which cooperate with said continuously rotating axle in order to move the transport trolley along said guidances or rails.

The stopping device has as a function either to let the transport trolley pass at a maximum speed when a stop of the transport trolley is not necessary (stopper completely drawn back); or to slow down such transport trolley and to bring it gradually to a complete standstill (stopper completely drawn out), when products placed upon such transport trolley have to be processed or similar; after standstill, to let the transport trolley gradually accelerate up to maximum speed (stopper partially drawn back).

The maximum speed reached by such transport trolley will be obtained when said driving wheels provided under such trolley are placed at an angle of 45 in respect to the longitudinal direction of said driving axle, whereas a complete standstill of the transport trolley in respect to the aforementioned rails will be achieved when these driving wheels form an angle of 90 with said driving axle and the speed of the transport trolley can be altered progressively between the standstill of the transport trolley and the maximum speed thereof by placing said driving wheels at other angles.

SUMMARY OF THE INVENTION

A great disadvantage of known stopping devices consists in that, when a transport trolley, is set moving again from a standstill, this is always accompanied by a sudden acceleration from 0 up to the maximum speed of the transport chain, as a result of which such transport trolley is subject to relatively large shocks, which, in certain cases, is not desired or allowed.

Therefore, the stopping device according to the invention aims at placing said driving wheels provided under such transport trolley, which are in contact with said driving axle, at the suitable moment at a suitable angle in respect to this driving axle, in order to be able to obtain a desired speed and to have the deceleration or acceleration of the transport trolley into or from a standstill run progressively.

This stopping device for a transport trolley which can be moved along guidances or rails and whereby the transport trolley is provided with driving wheels which cooperate with a rotating axle and which, by means of a lever with a contact wheel, can be set at different angles in respect to said driving axle, has as a characteristic that this stopping device consists of at least a lever with an ascending edge and a descending lateral edge, prolonged by an acceleration lever, the transition of which is formed by a tip, and a hydraulic, pneumatic or electric drive which can position said levers in three positions, namely, with said tip outside the path of said contact wheel and out of contact with the levers; with lever and tip entirely in the path of the contact wheel; and with the tip outside of the path of the contact wheel, however, with the contact wheel in contact with the acceleration lever.

BRIEF DESCRIPTION OF THE DRAWINGS

With the intention of better showing the characteristics of the present invention, hereafter, by way of example without any limitative character, a preferred form of embodiment of a stopping device according to the invention is described, with reference to the accompanying drawings, wherein.

DESCRIPTION OF THE PREFERRED EMBODIMENT

Figure 1:
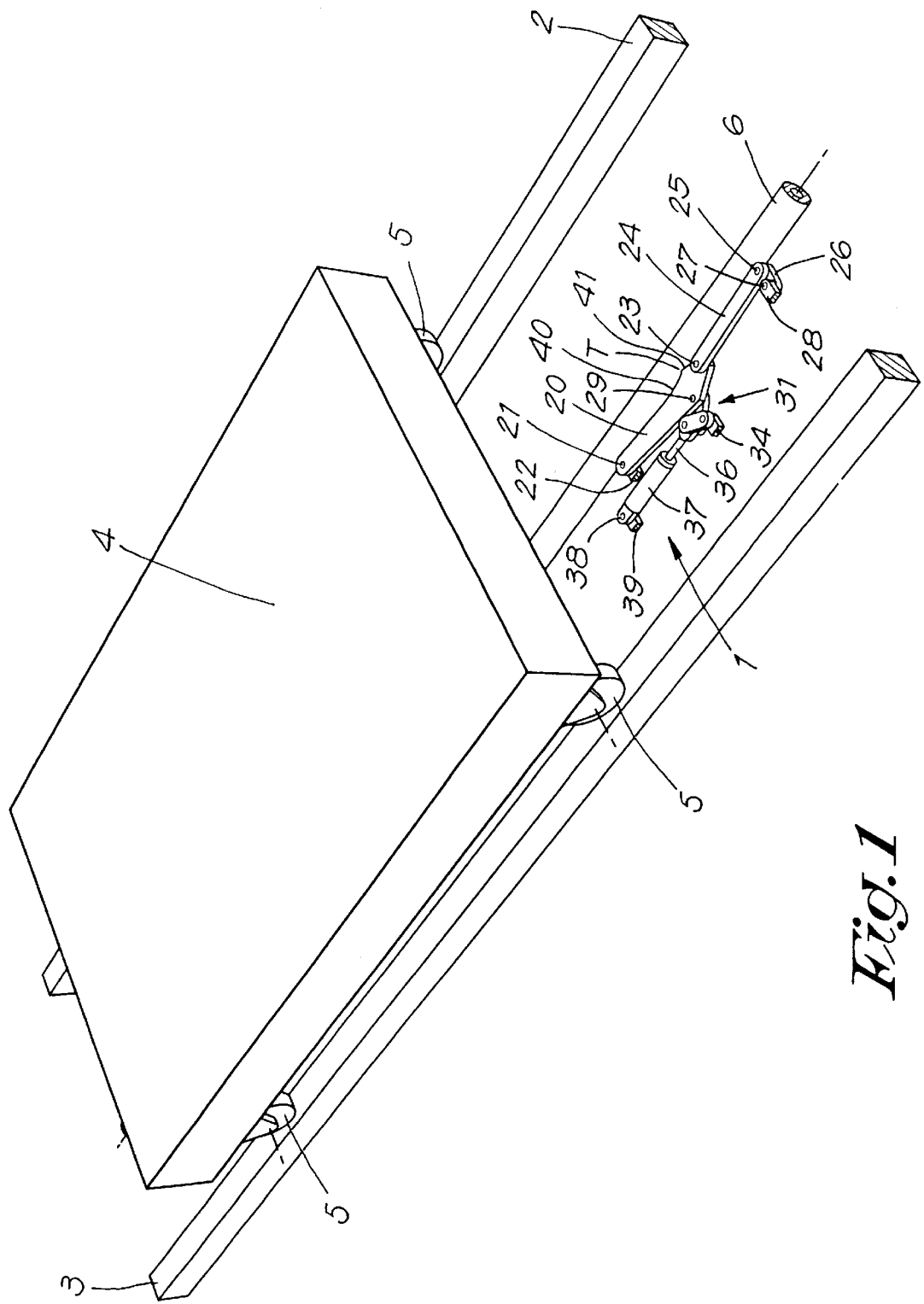
FIG. 1 represents a perspective view of a stopping device according to the invention, applied in a transport trolley driven by a driving axle.
Figure 2:
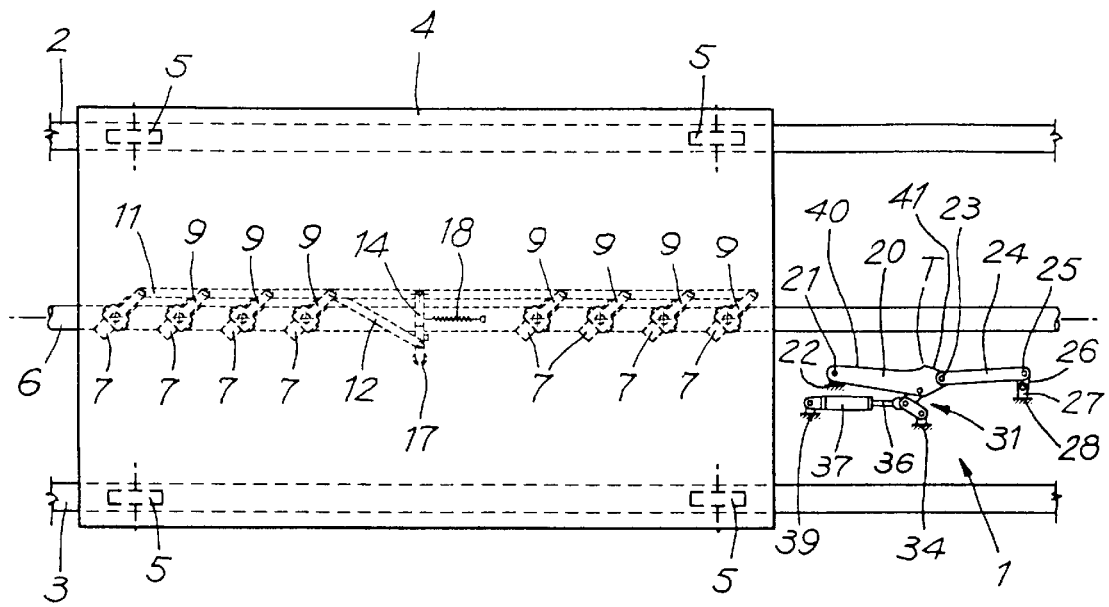
FIG. 2 represents a schematic top view of FIG. 1.
Figure 3:
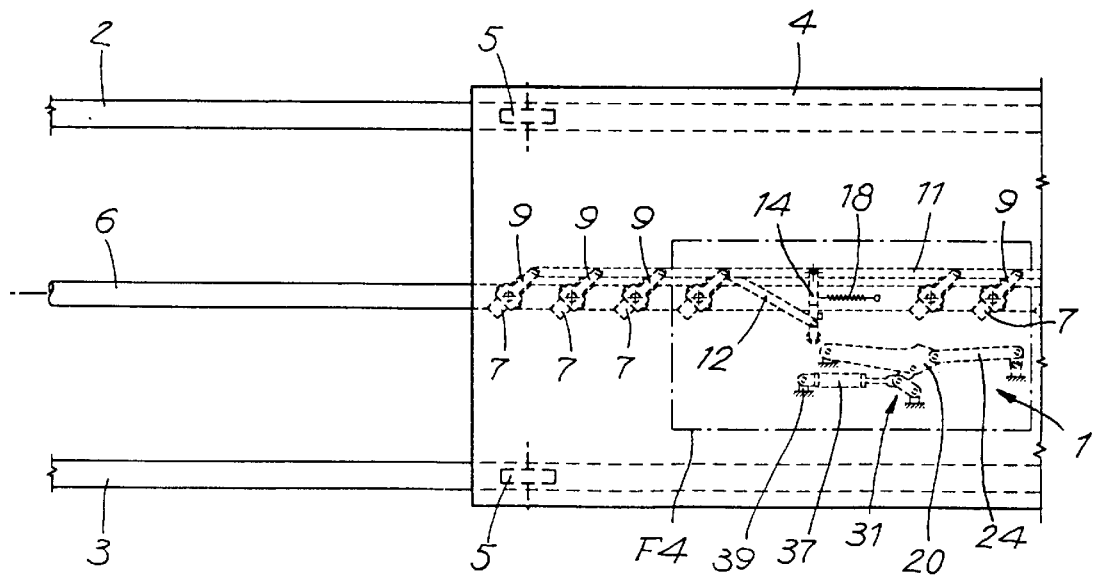
FIG. 3 represents a view similar to that of FIG. 2, but for another position of the transport trolley.

In FIG. 1, a stopping device 1 according to the invention is represented which is situated between two rails, 2–3, respectively, along which a transport trolley 4 can move by means of running wheels 5 and whereby between these rails 2–3 and parallel thereto, a driving axle 6 is provided which is driven continuously.

Such transport trolley 4 further is provided at its underside with a number of driving wheels 7 which are freely rotatable around a pivot 8 which in its turn is fixed in a support 9.

The support 9, at its free extremity, is fixed freely hingeable, by means of a pivot 10, to a rod 11 which is common for the different supports 9 of the different driving wheels 7.

Further, a rod 12 is connected freely hingeable to the rod 11, for example, in one of the pivots 10, whereby this rod 12 at its other extremity, by means of a pivot 13, is connected freely hingeable to a lever 14 which can pivot around a pivot 15 which is fixed at the underside of the transport trolley 4 in a suitable manner.

The second free extremity of the lever 14 is provided, by means of a pivot 16, with a freely rotatable contact wheel 17, whereas between the lever 14 and the bottom wall of the transport trolley 4, a spring 18 is provided which always aims at moving the lever 14 in contact with a stop 19.

The stopping device 1 according to the invention, the intention of which it is to let the transport trolley 4 either pass freely or to let the transport trolley 4 decelerate and stop completely; or to let the transport trolley accelerate from a complete standstill, consists of a first lever 20 (gradual deceleration and complete stop) which at one extremity is fixed freely hingeable at a pivot 21 which in its turn is fixed in a fixed support 22, whereas the second extremity of the lever 20, by means of a pivot 23, is connected freely hingeable to a second lever or acceleration lever 24 (gradual acceleration up to maximum speed) which, at its second extremity, by means of a pivot 25, is connected freely hingeable to a rod 26 which in its turn is connected freely hingeable, by means of a pivot 27, to a fixed support 28.

Further, the first part 30 of a bent lever 31 is connected to the first lever 20 by means of a pivot 29, whereby the second part 32 of said bent lever 31 is connected freely hingeable to, on one hand, said first part 30, by means of a pivot 33, and, on the other hand, to a fixed support 34, by means of a pivot 35.

On the pivot 33, also the free extremity of the piston rod 36 of an hydraulic or pneumatic cylinder 37 is provided, the body of said cylinder being connected freely hingeable to a fixed support 39 by means of a pivot 38, whereby said cylinder 37 is positioned almost parallel to the lever 20. Of course, the cylinder 37 can also be formed by an electric drive.

The functioning of the stopping device 1 according to the invention is very simple and as follows.

Figure 4:
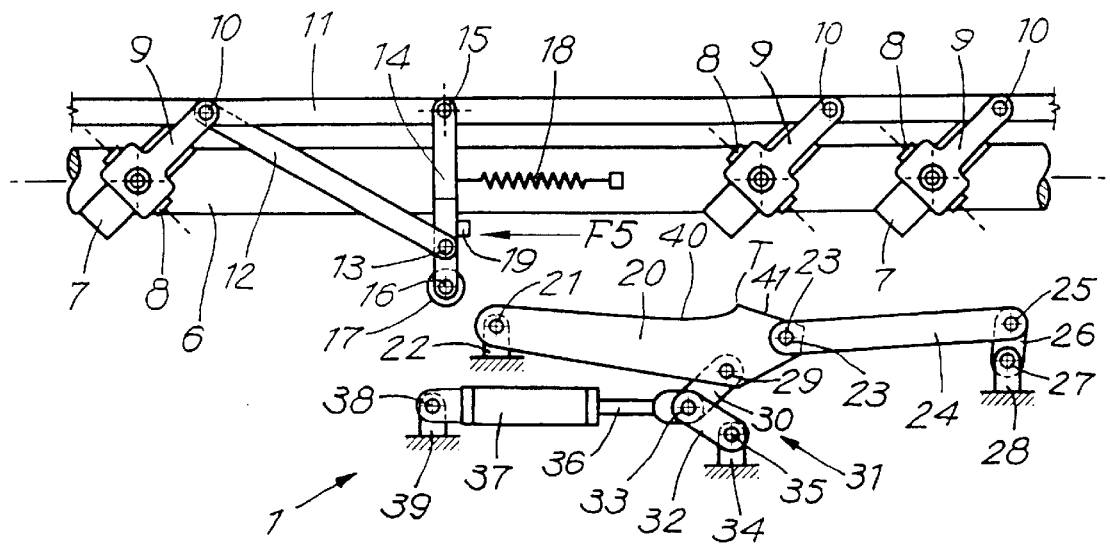
FIG. 4, at a larger scale, represents the stopping according to arrow F4 in FIG. 3.
Figure 5:
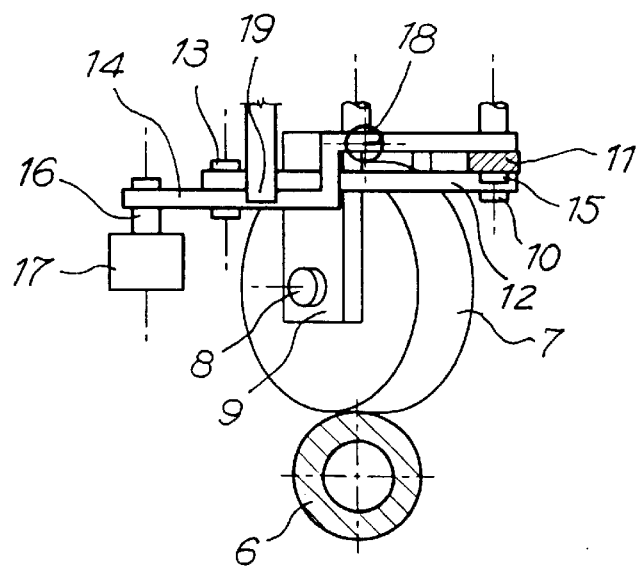
FIG. 5, at a large scale, represents a schematic view according to arrow F5 in FIG. 4.

In the position as represented in FIG. 4, the driving wheels 7 are in the position of maximum speed, namely, at an angle of 45 degrees in respect to the driving axle 6 and the stopping device 1 is in drawn-back position, such that the tip T of the first lever 20 is outside the path of the contact wheel 17.

In this position, the transport trolley 4 thus could pass freely, without having its speed slowed down in which manner whatsoever.

Figure 6:
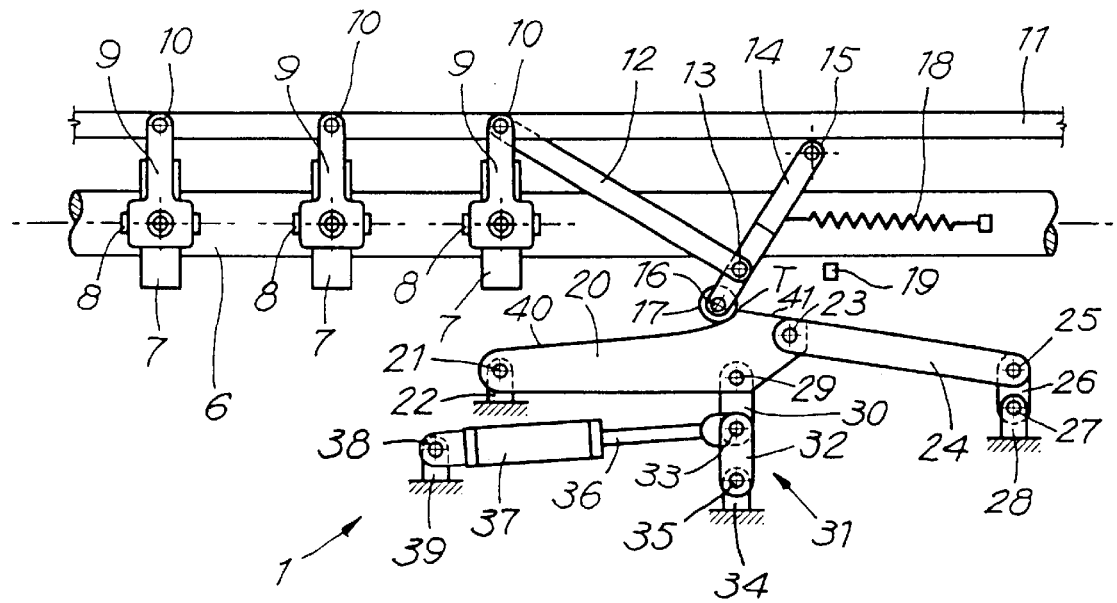
FIGS. 6 and 7 are similar to that of FIG. 4, but with the stopping device in two other positions.
Figure 7:
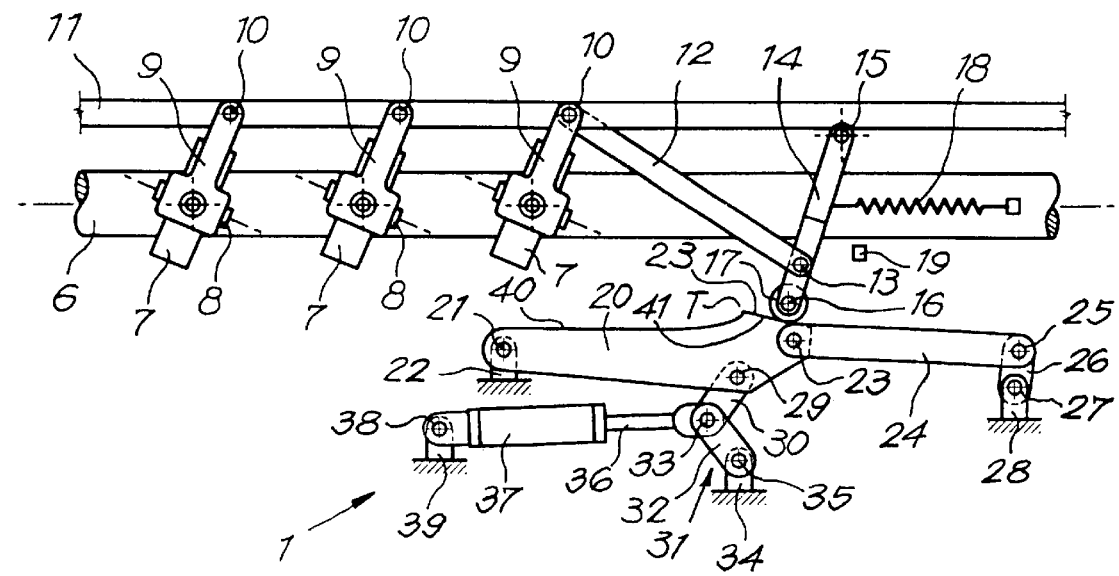

In FIG. 6 is represented that the lever 20 is placed completely in the path of the contact wheel 17, whereby the driving wheels 7 are turned over 90 degrees, such that the transport trolley 4 comes to a complete standstill and is kept at such s tandstill up to the moment when the lever 20 is partially drawn back by means of the cylinder 37.

As the contact wheel 17 at the height of the stopping device 1 first will come into contact with the ascending edge 40 of the first lever 20, as a result of which the driving wheels 7 are placed at an angle in respect to the driving axle 6 which is larger than 45 degrees, the transport trolley 4 will be slowed down gradually up to the point when the contact wheel 17 touches the tip T.

When lever 20, by means of cylinder 37, subsequently is partially drawn back, the contact wheel 17, under the influence of spring 18, will gradually move over the descending edge 41 of lever 20 and subsequently over the acceleration edge of lever 24, in such a manner that the driving wheels 7 are gradually brought from their zero position into a position of 45, such that the transport trolley 4 gradually accelerates.

It is obvious that in this manner, a stopping device 1 for a transport trolley 4 is obtained which allows to subject the transport trolley 4 to three different working regimes, namely, full speed; gradual deceleration up to complete standstill; and gradual acceleration from complete standstill.

The present invention is in no way limited to the embodiment described heretofore, but can be realized in a variety of forms and dimensions without leaving the scope of the invention.

What is claimed is:

1. A stopping device for a transport trolley guided along tracks, said transport trolley having driving wheels that cooperate with a driving axle, said driving wheels being pivotably connected to a rod pivotably connected to a first end of a first link and a first end of a second link, said second link being pivotably connected to said first link and having a contact wheel mounted on a second end thereof, wherein said stopping device comprises:

a first lever including an ascending edge and a descending lateral edge longitudinally spaced along said first lever, said first lever further including a tip to define a transition between said ascending edge and said descending lateral edge;

an acceleration lever connected at one end to said first lever and pivotably linked at another end to a fixed support; and an actuator linked to said first lever for moving said first and acceleration levers between operative and inoperative positions, wherein while in said operative position said ascending edge, said descending lateral edge and said tip are arranged to contact said contact wheel and as a result urge said first and second links to pivot to move said rod.

2. The stopping device of claim 1 wherein the first lever is pivotably connected to said actuator, said actuator being arranged in a direction generally parallel to said first lever.

3. The stopping device of claim 2 further including a bent lever, said bent lever being pivotably connected between said first lever and said actuator.

* * * * *